US007180407B1

(12) United States Patent
Guo et al.

(10) Patent No.: US 7,180,407 B1
(45) Date of Patent: Feb. 20, 2007

(54) VEHICLE VIDEO COLLISION EVENT RECORDER

(76) Inventors: Pengju Guo, 414 Peninsula Ave., Burlingame, CA (US) 94010; Wenfeng Guo, 414 Peninsula Ave., Burlingame, CA (US) 94010

( * ) Notice: Subject to any disclaimer, the term of this patent is extended or adjusted under 35 U.S.C. 154(b) by 138 days.

(21) Appl. No.: 10/987,730

(22) Filed: Nov. 12, 2004

(51) Int. Cl.
*B60Q 1/00* (2006.01)

(52) U.S. Cl. ...................... 340/436; 340/438; 340/435; 701/35; 348/148

(58) Field of Classification Search ........ 340/435–436, 340/438; 348/148, 143; 701/213, 29–35, 701/207
See application file for complete search history.

(56) References Cited

U.S. PATENT DOCUMENTS 5,325,082 A * 6/1994 Rodriguez .................. 340/438
6,246,933 B1 * 6/2001 Bague ......................... 701/35
6,498,978 B2 * 12/2002 Leamy et al. ............... 701/100
6,630,884 B1 * 10/2003 Shanmugham .............. 340/436
6,718,239 B2 * 4/2004 Rayner ........................ 701/35
2002/0044049 A1 * 4/2002 Saito et al. ................. 340/438
2002/0091473 A1 * 7/2002 Gardner et al. ............... 701/35
2005/0043868 A1 * 2/2005 Mitcham ..................... 701/29
2005/0273218 A1 * 12/2005 Breed et al. .................... 701/2
2006/0093997 A1 * 5/2006 Kearby et al. .............. 434/185

* cited by examiner

*Primary Examiner*—Jeffery Hofsass
*Assistant Examiner*—Hoi C. Lau
(74) *Attorney, Agent, or Firm*—Schein & Cai LLP; James Cai

(57) ABSTRACT

A vehicle video collision event recorder includes a vehicle video collision event recorder includes a control module for accepting at least one decoded engine performance data and at least one processed video signal, a video mixer for processing at least one video signal, at least one video camera for providing the at least one video signal, a decoder for decoding at least one engine performance data from an on-board diagnostic system, a collision sensor coupled to the control module, and a storage device for storing an output signal representative of the decoded engine performance data and the processed video signal.

19 Claims, 4 Drawing Sheets

VEHICLE VIDEO COLLISION EVENT RECORDER

BACKGROUND OF THE INVENTION

The present invention relates to vehicle collision event recorders and more particularly to a vehicle video collision event recorder having engine performance data inputs from an on-board diagnostic system which are recorded to a non-volatile memory.

Vehicle collision event recorders are known in the art and may include various inputs including video, audio, radar, light, vehicle speed, and brake information. Such data inputs may help in shedding light on the cause of a vehicle collision and may be used by police agencies, courts and insurance claims adjusters. However, none of the prior art systems disclose a vehicle collision event recorder capable of recording engine performance data inputs from an on-board diagnostic system.

A system for sensing, storing and updating operation parameters, visual conditions and audible conditions for an automotive vehicle is disclosed in U.S. Pat. No. 6,246,933 entitled "Traffic Accident Data Recorder and Traffic Accident Reproduction System and Method". The system includes a plurality of sensors for registering vehicular operation parameters, including at least one vehicle-mounted digital video/audio camera. A microprocessor controller responsive to the vehicle operational parameters which have been registered by the plurality of sensors and video images and audio signals from the video/audio/camera is provided for processing the operational parameters and the video images and the audio signals. A rewritable non-volatile memory is provided for storing those processed operational parameters, video images and audio signals which are provided by the microprocessor controller. The disclosed operational parameters include braking pressure, brake temperature, brake line hydraulic pressure, average speed, acceleration or deceleration in one or more dimensions, rate of turning, steering angle, compass direction of travel, impact, tire pressure, cruise control status, windshield wiper status, fog light status, defroster status, and geographic positioning information. The disclosed operational parameters do not include engine performance data inputs from an on-board diagnostic system.

A method and apparatus for monitoring the operation of a motor vehicle for the purposes of determining causation and fault in the event of an accident is disclosed in U.S. Pat. No. 6,570,609 entitled "Method and Apparatus for Monitoring Operation of a Motor Vehicle". The apparatus includes one or more systems having means to produce images and to store those images in a retrievable form. Each system comprises one or more strategically located sensor arrays which are placed to obtain sequential images of the area immediately in front and to the rear of the motor vehicle and, optionally, the interior of the vehicle as well. Supplemental information from a separate source may also be included in the image. Such separate supplemental information may usefully comprise location data from a ground positioning satellite system, and the information may be recorded as part of the image either as geographic coordinates or as a street or highway address. The disclosed method and apparatus does not record engine performance data inputs from an on-board diagnostic system.

Another vehicle collision event recorder is disclosed in U.S. Pat. No. 6,718,239 entitled "Vehicle Event Data Recorder Including Validation of Output". The event recorder includes sensors, including an image sensor, a sound sensor, a location sensor, and vehicle performance sensors, and a capture circuit for storing sensed data signals around a triggering event. A CPU and program memory are programmed to perform a validation function, such as a one-way hash function, on the captured sensor signal while transferring it to a persistent memory device so as to derive a validation value which is also stored in the persistent memory device. The disclosed recorder receives as inputs engine operating parameters including temperature, fuel flow rate and power output. The disclosed recorder does not receive as input engine performance data inputs such as those available from an engine on-board diagnostics device.

As such there is a need in the art for a vehicle video collision event recorder having engine performance data inputs from an on-board diagnostic system. Preferably the video and engine performance data inputs are recorded to a non-volatile memory such as a flash memory or USB memory device which may be continually overwritten. Preferably the video and engine performance data inputs may be written to the non-volatile memory for a pre-determined amount of time following an accident and the non-volatile memory used as a record of the conditions surrounding the accident.

SUMMARY OF THE INVENTION

In accordance with one aspect of the invention, a vehicle video collision event recorder includes a control module for accepting at least one decoded engine performance data and at least one processed video signal, a video mixer for processing at least one video signal, at least one video camera for providing the at least one video signal, a decoder for decoding at least one engine performance data from an on-board diagnostic system, a collision sensor coupled to the control module, and a storage device for storing an output signal representative of the decoded engine performance data and the processed video signal.

In another aspect of the invention, a method of recording a vehicle collision event includes the steps of receiving at least one video input, receiving at least one engine performance input, mixing the received at least one video input and the received at least one engine performance input to form an output signal, recording the output signal, and halting the recording of the output signal in the event of a vehicle collision.

In yet another aspect of the invention, a vehicle video collision event recorder includes a control module for accepting at least one decoded engine performance data, at least one processed video signal, and a date and time stamp and providing an output signal representative of the at least one decoded engine performance data, the at least one processed video signal and the date and time stamp, a video mixer for processing at least one video signal, at least one video camera for providing the at least one video signal, a decoder for decoding at least one engine performance data from an on-board diagnostic system, a date and time stamp device coupled to the control module, a collision sensor coupled to the control module, the collision sensor operable to detect a vehicle collision and cause the control module to cease outputting the output signal after a pre-determined time, and a storage device for storing the output signal.

These and other features, aspects and advantages of the present invention will become better understood with reference to the following drawings, description and claims.

DETAILED DESCRIPTION OF THE INVENTION

The following detailed description is of the best modes of carrying out the invention. The description is not to be taken in a limiting sense, but is made merely for the purpose of illustrating the general principles of the invention, since the scope of the invention is best defined by the appended claims.

Figure 1:
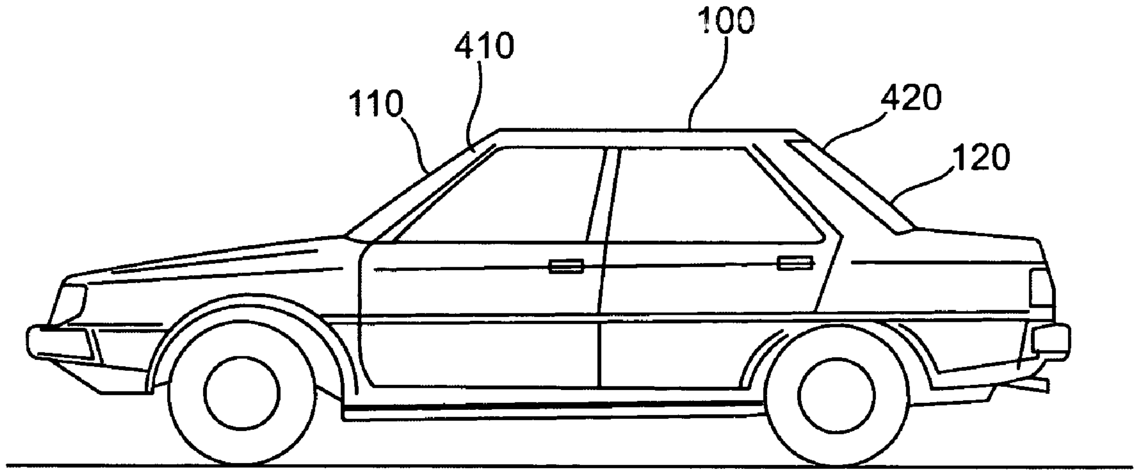
FIG. 1 illustrates a vehicle having disposed therein a vehicle video collision event recorder in accordance with the invention.
Figure 2:
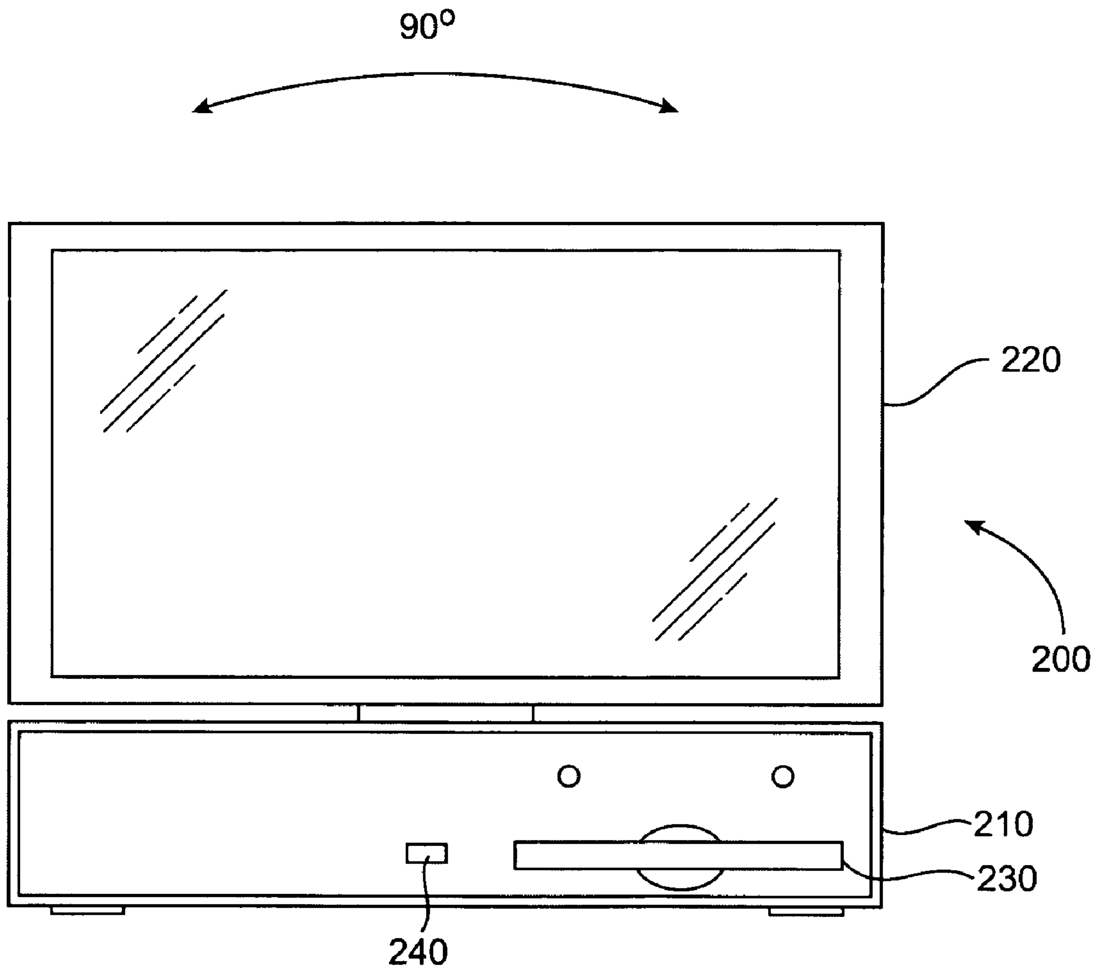
FIG. 2 illustrates a front elevation view of a housing and monitor in accordance with the invention.
Figure 4:
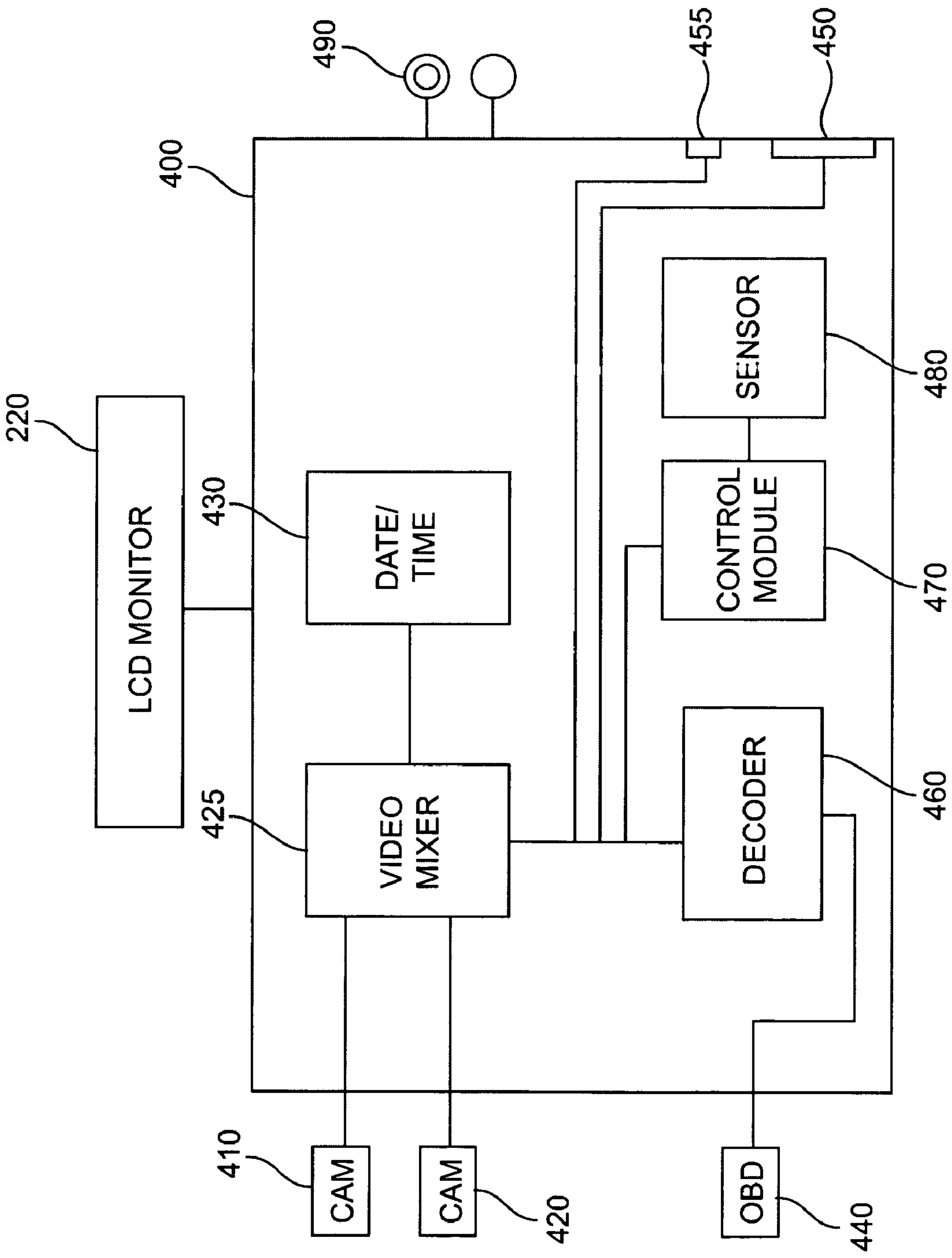
FIG. 4 illustrates a schematic representation of a control circuit in accordance with the invention.

With reference to the drawings, the present invention provides a vehicle video collision event recorder generally designated 200 as shown in FIG. 2. A control circuit 400 (FIG. 4) may include a forward video camera 410 and a rear video camera 420. As shown in FIG. 1, forward video camera 410 may be disposed in a vehicle 100 proximate a vehicle windshield 110 while rear video camera 420 may be disposed in the vehicle 100 proximate a vehicle rear window 120. Forward video camera 410 and rear video camera 420 preferably provide for a wide viewing angle between 90 and 120 degrees. While two cameras are shown, those skilled in the art will appreciate that additional cameras may be added without departing from the spirit of the invention.

Control circuit 400 may be disposed in a housing 210 (FIG. 2) to which may be hingedly attached a display 220 which may include an LCD monitor or memory reader. A slot 230 may be disposed in the housing 210 for accepting a flash memory card. A USB port 240 may be disposed in the housing for accepting a USB memory device.

Figure 3:
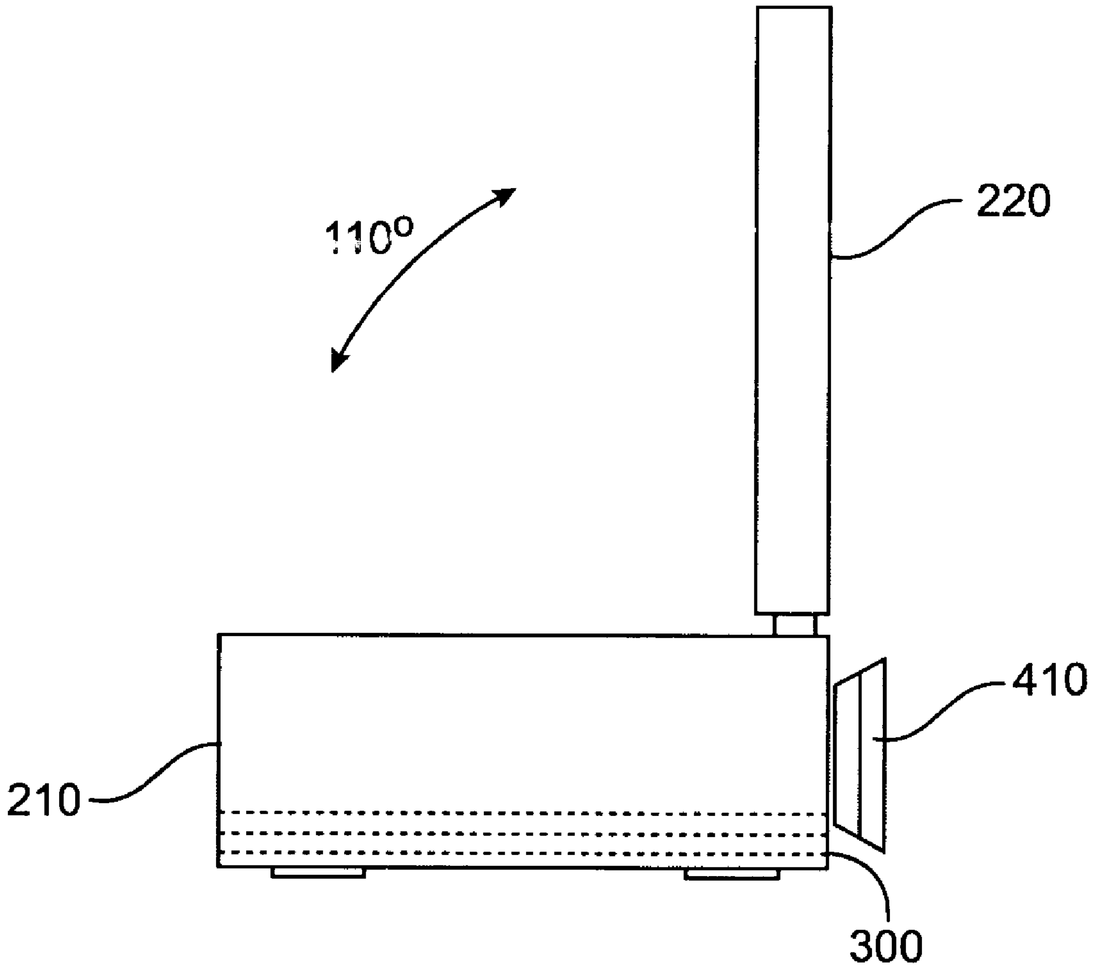
FIG. 3 illustrates a side elevation view of the housing and monitor in accordance with the invention.

With reference to FIG. 3, in an alternative embodiment of the invention, the forward video camera 410 may be disposed on a rear portion 300 of the housing 210.

Control circuit 400 may include a control module 470 for controlling accepting at least one decoded engine performance data and at least one processed video signal. A video mixer 425 may be coupled to forward video camera 410 and to rear video camera 420. Video mixer 425 may be operable to receive video signals from forward and read video cameras 410 and 420 and process the received video signals to provide the at least one processed video signal to the control module 470. A date and time stamping device 430 may be coupled to the control module 470 to provide a date and time stamp. An output signal representative of the decoded engine performance data and the processed video signal may be displayed on display 220.

The vehicle video collision event recorder 200 of the present invention advantageously provides for engine performance data which may be recorded by a flash memory card inserted into a flash memory interface 450 and a USB memory device inserted into a USB memory interface 455. Such engine performance data may include those provided by an on-board diagnostic system 440 such as OBD1 or OBD2. On-board diagnostic system 400 may be coupled to a decoder 460 for decoding at least one engine performance data. The at least one decoded engine performance data may be provided to the control module 470 and displayed on display 220 and saved to the flash memory card and the USB memory device.

A output 490 may be provided for use with an alternative display or with an alarm.

In use received inputs including video signals and engine performance data may be displayed on display 220 and saved to the flash memory card and the USB memory device. These inputs may be overwritten in the flash memory card and the USB memory device as necessary. In the event of a collision, a collision sensor 480 coupled to control module 470 may be operable to shut off power to the control circuit 400 after a pre-determined amount of time. In such manner, the inputs stored in the flash memory card and the USB memory device may be retrieved from the vehicle video collision event recorder 200 for later use.

It should be understood, of course, that the foregoing relates to preferred embodiments of the invention and that modifications may be made without departing from the spirit and scope of the invention as set forth in the following claims.

We claim:

1. A vehicle video collision event recorder, comprising:
- a control module for accepting at least one decoded engine performance data and at least one processed video signal;
- a video mixer for processing at least one video signal;
- at least one video camera for providing the at least one video signal;
- a decoder for decoding at least one engine performance data from an on-board diagnostic system;
- a collision sensor coupled to the control module; and
- a storage device for storing and output signal representative of the decoded engine performance data and the processed video signal.

2. The video collision event recorder of claim 1, further comprising a display coupled to the control module.

3. The vehicle video collision event recorder of claim 1, wherein the collision sensor is operable to detect a vehicle collision and caused the control module to cease outputting the output signal after a pre-determined time.

4. The vehicle video collision event recorder of claim 1, wherein storage device comprises a flash memory card.

5. The vehicle video collision event recorder of claim 1, wherein storage device comprises a USB memory device.

6. The vehicle video collision event recorder of claim 1, further comprising a flash memory card interface coupled to the control module.

7. The vehicle video collision event recorder of claim 1, further comprising a USB interface coupled to the control module.

8. The vehicle video collision event recorder of claim 1, further comprising a date and time device coupled to the video mixer, the video mixer being operable to receive a date and time stamp from the date and time device.

9. A method of recording a vehicle collision event comprising the steps of:
- receiving at least one video input;
- receiving at least one engine performance input;
- mixing the received at least one video input and received at least one engine performance input to form an output signal;
- recording the output signal; and
- halting the recording of the output signal in the event of a vehicle collision.

10. The method of recording a vehicle collision event of claim 9, wherein the recording of the output signal is halted after the expiration of a pre-determined amount of time.

11. The method of recording a vehicle collision event of claim 9, wherein the at least one engine performance input is received from an on-board diagnostic system.

12. The method of recording a vehicle collision event of claim 9, further comprising receiving a date and time stamp and mixing the received date and time to stamp with the output signal.

13. The method of recording a vehicle collision event of claim 9, further comprising decoding the received at least one engine performance input.

14. The vehicle video collision event recorder comprising:

a control module for accepting at least one decoded engine performance data, at least one processed video signal, and a date and time stamp and providing an output signal representative of the at least one decoded engine performance data, the at least one processed video signal and the date and time stamp;

a video mixer for processing at least one video signal;

at least one video camera for providing the at least one video signal;

a decoder for decoding at least one engine performance data from an on-board diagnostic system;

a date and time stamp device coupled to the control module; and a collision sensor coupled to the control module, the collision sensor operable to detect a vehicle collision and caused a controlled module to cease outputting the output signal after a predetermined time; and a storage device for storing the output signal.

15. The vehicle video collision event recorder of claim 14, further comprising a display coupled to the control module.

16. The vehicle video collision event recorder of claim 14, wherein storage device comprises a USB memory device.

17. The vehicle video collision event recorder of claim 14, wherein the storage device comprises a flash memory card.

18. The vehicle video collision event recorder of claim 14, further comprising a flash memory card interface coupled to the control module.

19. The vehicle video collision event recorder of claim 14, further comprising a USB interface coupled to the control module.

* * * * *